INVENTOR.
Dean B. Harrington

United States Patent Office 3,201,627
Patented Aug. 17, 1965

---

3,201,627
POLYPHASE GENERATORS
Dean B. Harrington, Saratoga, N.Y., assignor to General Electric Company, a corporation of New York
Filed Oct. 6, 1960, Ser. No. 61,008
13 Claims. (Cl. 310—198)

The present invention relates to dynamoelectric machines, and more particularly to improved armature windings for polyphase generators of large size.

A conventional turbine-driven polyphase generator of large size comprises a stationary armature element and a cooperating rotatable field element, and may be operative to generate 3-phase electric power at a frequency of 60 cycles, whereby the field element, if of 4-pole construction, is rotated at 1800 r.p.m. In the generator, the armature element or core is formed of magnetizable material and is normally provided with an elongated cylindrical opening therethrough that is bounded by a number of angularly spaced-apart winding slots, in which a composite 3-phase winding is carried, the armature winding including three individual phases that are often connected in Y or star relation to supply the load.

The field element is also formed of magnetizable material and is normally of the elongated cylindrical-rotor type and carries a field winding, the field element being arranged in the armature opening and being operative upon rotation to induce phase voltages in the respective phases of the armature winding. Ordinarily, each phase of the armature winding includes a number of phase belts, each provided with a plurality of series connected coils, each having two coil sides, the coil sides being distributed in the winding slots of the armature element; the armature winding is arranged in two layers so that each winding slot receives two of the coil sides respectively disposed in the top and in the bottom thereof; and each of the coil sides includes an insulating casing enclosing the conductors thereof for the purpose of electrically insulating the coil side from the contiguous coil side and from the armature element. In directly cooled machines, each of the winding slots also accommodates facility for cooling the two contained coil sides, which cooling facility ordinarily includes a duct arrangement through which a current of air or other gas or stream of liquid is forced; whereby each of the slots must accommodate two of the coil sides, as well as the cooling facility therefor; and each of the coil sides includes the conductors thereof and the enclosing insulating casing.

Now in the design of polyphase generators, there is an ever-increasing demand for greater power ratings; whereby the competition for space in the armature between the magnetic material thereof and the winding slots therein, and among the several elements arranged in each winding slot thereof presents design problems of ever-increasing complexity.

Accordingly, it is a general object of the present invention to provide in a polyphase generator, an improved arrangement of the composite armature winding so that an increased power output may be realized from a generator structure of given physical dimensions, whereby the power output per unit volume of the generator construction is substantially increased.

Another object of the invention is to provide a polyphase generator having a relatively high power output rating and a relatively low voltage rating and comprising a composite armature winding provided with three parallel circuits per phase per set of four poles in which the circulating current losses caused by the unbalanced voltages in the parallel circuits are negligible.

A further object of the invention is to provide a dynamoelectric machine provided with a polyphase winding including in each phase thereof three parallel circuits that are arranged in a number of a set of four phase belts.

A further object of the invention is to provide a dynamoelectric machine of the character described, wherein each of the three parallel circuits in each phase includes either two series connected sections respectively disposed in two of the four phase belts or three series connected sections respectively disposed in three of the four phase belts.

A further object of the invention is to provide a dynamoelectric machine of the character described, wherein each of the three parallel circuits in each phase includes either three series connected sections respectively disposd in three of the four phase belts or four series connected sections respectively disposed in the four phase belts.

A further object of the invention is to provide a dynamoelectric machine of the character described, wherein each of the three parallel connected circuits in each phase of the winding includes eight series connected coils each having two coil sides, wherein the coil sides mentioned are arranged in predetermined sequences in the slots provided in the magnetizable core structure, so as to minimize voltage and phase unbalance among the individual ones of the three parallel connected circuits in each phase.

A further object of the invention is to provide a dynamoelectric machine of the character described comprising a winding including three parallel connected circuits per phase, each circuit includes eight series connected coils distributed in a predetermined sequence in a number of four phase belts, each phase belt including six contiguous winding slots.

A still further object of the invention is to provide a dynamoelectric machine comprising a polyphase 3-circuit, 4-pole armature winding having a pattern so that the relative heating thereof is not materially in excess of 1.04.

A still further object of the invention is to provide a dynamoelectric machine comprising a 3-phase, 3-circuit, 4-pole armature winding arranged in seventy-two slots provided in a magnetizable core structure.

Further features of the invention pertain to the particular arrangement of the elements of the polyphase generator, whereby the above-outlined and additional operating features thereof are attained.

The invention, both as to its organization and principle of operation, together with further objects and advantages thereof, will best be understood by reference to the following specification, taken in connection with the accompanying drawings, in which.

Figure 1:
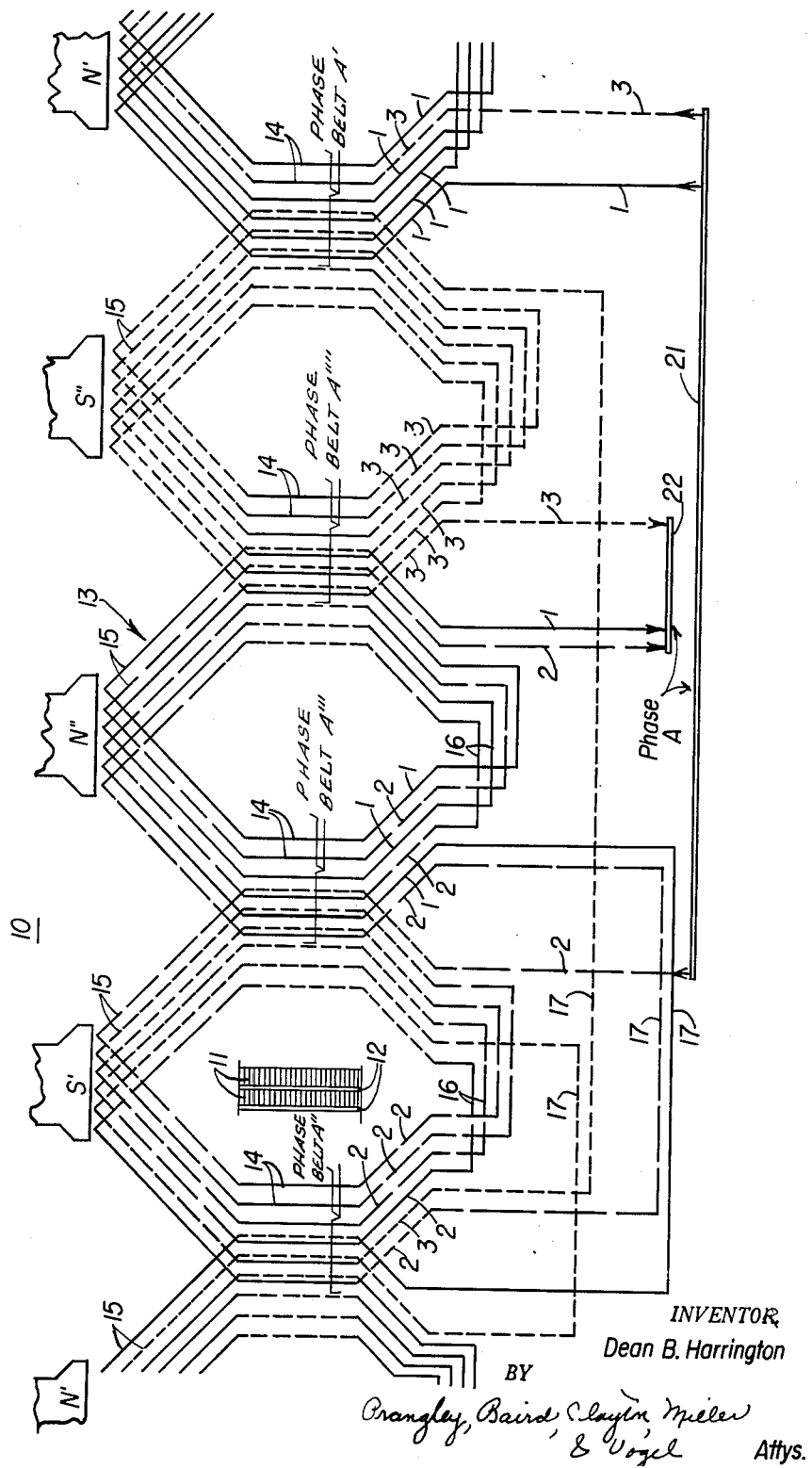
FIGURE 1 is a diagrammatic illustration of a portion of a dynamoelectric machine provided with an armature winding embodying the present invention, the machine being in the form of a generator of 4-pole, 3-phase, 72-slot core construction, the armature winding having three parallel circuits per phase, only one phase of the 3-phase armature winding being illustrated.
Figure 2:
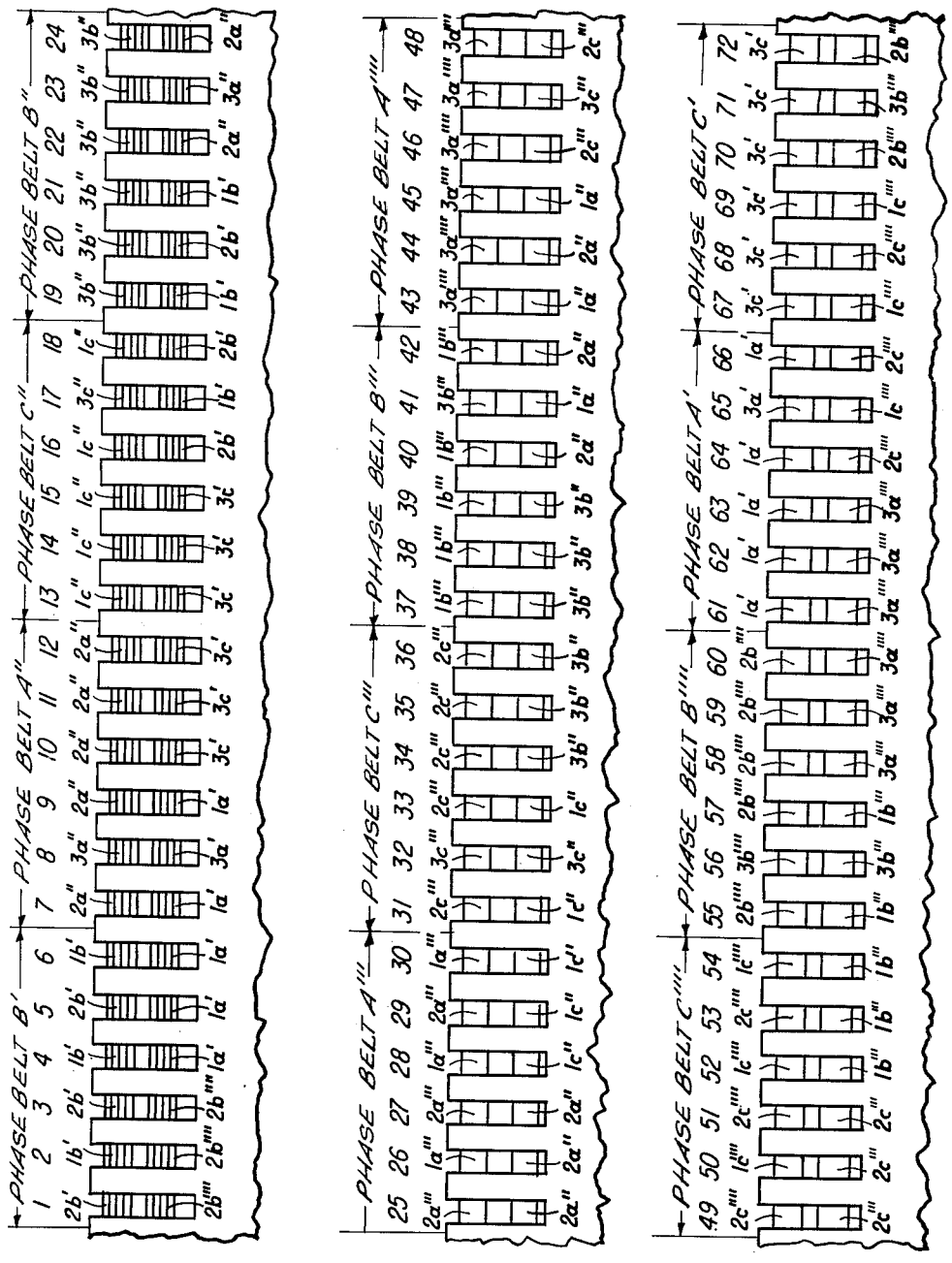
FIG. 2 is an enlarged fragmentary vertical developed view of the armature element of the generator and the 3-phase armature winding carried in the slots of the core thereof.

Referring now to FIGS. 1 and 2 of the drawings, there is illustrated a dynamoelectric machine 10 in the form of of a turbine-driven generator, and embodying the features of the present invention. The generator 10 is of the 4-pole, 3-phase, 3-circuit type, and comprises a stationary armature element or core 11 of magnetizable material and a cooperating rotary field element represented by the poles respectively indicated at N', S', N'' and S''. The core 11 comprises seventy-two slots 12; and a two layer 3-phase winding 13 carried by the core 11. The winding 13 comprises the three phases, A, B and C, and consists of seventy-two coils, each including two coil sides 14 and an end turn or connector 15, as well as a regular connecting end strap 16. In FIG. 1, only phase A of the winding 13 is illustrated; however, in FIG. 2, the arrangement of the coil sides 14 in all three phases A, B and C is illustrated. More particularly, in the generator 10, the pole pitch is eighteen slots of the core 11; and in the armature winding 13, the coils are chorded having a coil pitch equal to 15/18 of the pole pitch, as illustrated in FIGS. 1 and 2. However, it will be understood that the invention is readily applicable to other coil pitches, as explained more fully below.

Figure 3:
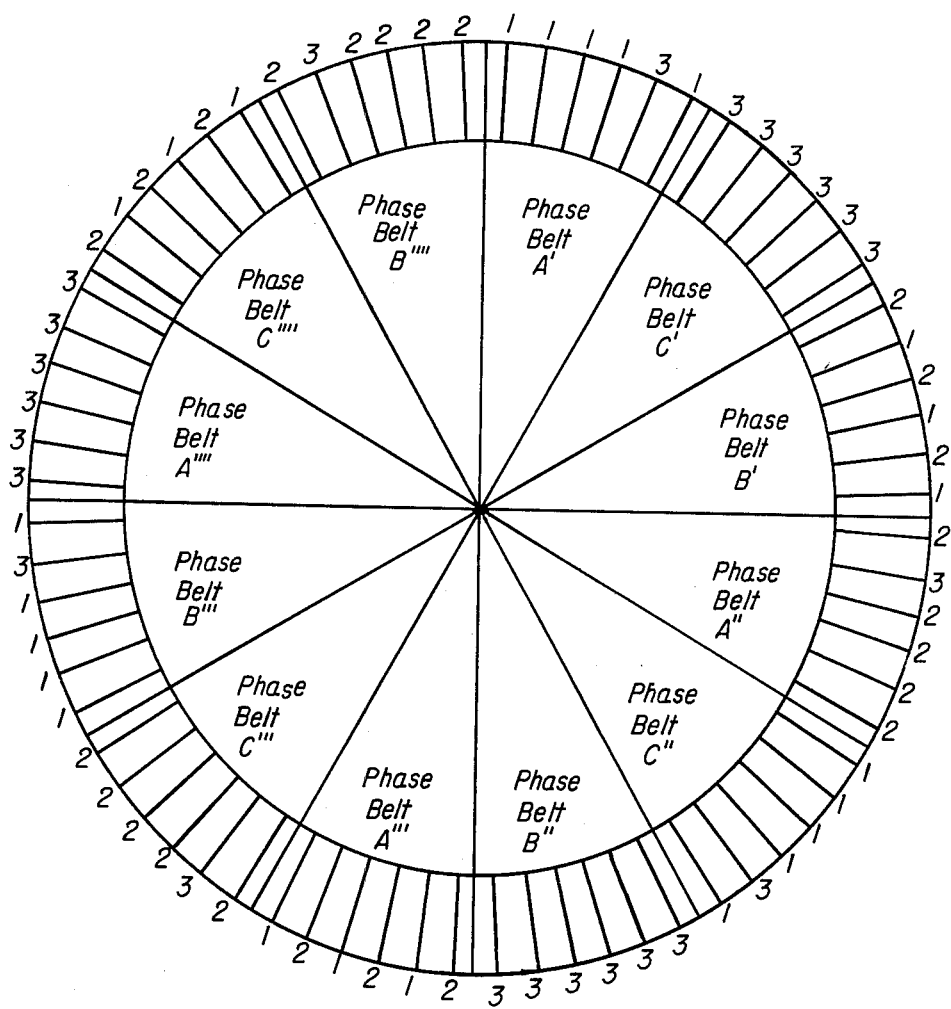
FIG. 3 is a combined schematic diagram of the phase belt arrangement in the armature winding and a vectorial diagram of the phase voltage components induced in the different coils of the armature winding.

As indicated in FIG. 3, the winding 13 comprises six positive phase belts (respectively designated A', B', C', A''', B''' and C''') and six negative phase belts (respectively designated A'', B'', C'', A'''', B'''' and C'''') that are arranged in sequence about the core 11. Each of the phase belts comprises a section of one or two of the three parallel connected circuits in the corresponding phase, and each circuit in each phase comprises two or three sections disposed in two or three of the four phase belts. The various sections of each of the three parallel connected circuits in the various ones of the four phase belts A', A'', A''' and A'''' in phase A are properly poled and connected in series relation, since two of the phase belts are respectively under the two north poles N' and N'', while the other of the two phase belts are respectively under the two south poles S' and S'', so that the phase voltages respectively induced therein are substantially of the same magnitude and substantially in-phase; whereby phase A of the winding 13 comprises the three parallel connected circuits.

Still referring to FIG. 3, each of the twelve phase belts of the winding 13 subtends sixty electrical degrees and includes six coils. It will be noted that the positive phase belt A' includes only coils of circuits 1 and 3 of phase A, that the negative phase belt A'' includes only coils of circuits 2 and 3 of phase A, that the positive phase belt A''' includes only coils of circuits 1 and 2 of phase A, and that the negative phase belt A'''' includes only coils of circuit 3 of phase A.

Referring now to FIG. 1, it will be observed that the six coil sides 14 of the six coils arranged in the positive phase belt A' are distributed in the winding slots 12 of the core 11 in the particular pattern or sequence: 111131; that the six coil sides 14 of the six coils arranged in the negative phase belt A'' are distributed in the winding slots 12 of the core 11 in the particular pattern or sequence: 232222; that the six coil sides 14 of the six coils arranged in the positive phase belt A''' are distributed in the winding slots 12 of the core 11 in the particular pattern or sequence: 212121; and that the six coil sides 14 of the six coils arranged in the negative phase belt A'''' are arranged in the winding slots 12 of the core 11 in the particular pattern or sequence: 333333.

As a consequence of this composite arrangement of the coil sides 14 of the three parallel connected circuits 1, 2 and 3 in the four phase belts A' A'', A''' and A'''' of phase A, the resulting voltages in the three parallel connected circuits 1, 2 and 3 in phase A are substantially in-phase; and also these voltages are of substantially the same magnitude.

As a matter of convenience in following the circuits in FIG. 1, the coil sides 14 included in the circuit 1 have been illustrated in solid lines, the coil sides 14 included in the circuit 2 have been illustrated in broken lines, and the coil sides 14 included in the circuit 3 have been illustrated in dotted lines.

It is noted that the winding patterns of the coils included in phases B and C are identical to those of the coils included in phase A, as illustrated in FIG. 1 and described above; which condition, while not shown in FIG. 1, is fully illustrated in FIG. 2 by the arrangement and disposition of the coil sides 14 in the winding slots 12 of the core 11. Specifically as shown in FIG. 2: phase belt B' comprises the winding slots 1 to 6, inclusive, containing the coil sides 2b', 1b', etc., that are respectively, included in the two circuits in this phase belt; phase belt A'' comprises the winding slots 7 to 12, inclusive, containing the coil sides 2a'', 3a'', etc., that are respectively included in the two circuits in this phase belt; phase belt C'' comprises the winding slots 13 to 18, inclusive, containing the coil sides 1c'', 3c'', etc., that are respectively included in the two circuits in this phase belt; phase belt B'' comprises the winding slots 19 to 24, inclusive, containing the coil sides 3b'' that are included in the single circuit in this phase belt; phase belt A''' comprises the winding slots 25 to 30, inclusive, containing the coil sides 2a''', 1a''', etc., that are respectively included in the two circuits in this phase belt; phase belt C''' comprises the winding slots 31 to 36, inclusive containing the coil sides 2c''', 3c''', etc., that are respectively included in the two circuits in this phase belt; phase belt B''' comprises the winding slots 37 to 42, inclusive, containing the coil sides 1b''', 3b''', etc., that are respectively included in the two circuits in this phase belt; phase belt A'''' comprises the winding slots 43 to 48, inclusive, containing the coil sides 3a'''' that are included in the single circuit in this phase belt; phase belt C'''' comprises the winding slots 49 to 54 inclusive, that contain the coil sides 2c'''', 1c'''', etc., that are respectively included in the two circuits in this phase belt; phase belt B'''' comprises the winding slots 55 to 60, inclusive, that contain the coil sides 2b'''', 3b'''', etc., that are respectively included in the two circuits in this phase belt; phase belt A' comprises the winding slots 61 to 66, inclusive, containing the coil sides 1a', 3a', etc., that are respectively included in the two circuits in this phase belt; and phase belt C' comprises the winding slots 67 to 72, inclusive, containing the coil sides 3c' that are included in the single circuit in this phase belt. Also, the particular inclusion of the three circuits in each phase in the several phase belts as indicated in FIG. 3.

Re-examining the arrangement and distribution of the circuits 1, 2 and 3 in phase A, in the four phase belts A', A'', A''' and A'''' respectively corresponding to the poles N', S', N'', S'', in terms of both the occurrences and the positions thereof in the winding slots, these relationships are set forth in Table I below:

*TABLE I*

| Slot Position | 1 | 2 | 3 | 4 | 5 | 6 |
|---|---|---|---|---|---|---|
| Pole N' | 1 | 1 | 1 | 1 | 3 | 1 |
| Pole S' | 2 | 3 | 2 | 2 | 2 | 2 |
| Pole N'' | 2 | 1 | 2 | 1 | 2 | 1 |
| Pole S'' | 3 | 3 | 3 | 3 | 3 | 3 |

Accordingly, circuit 1 appears once in a first slot position, twice in a second slot position, once in a third slot position and twice in a fourth slot position and at no time in a fifth slot position and twice in a sixth slot position.

Circuit 2 appears twice in a first slot position, at no time in a second slot position, twice in a third slot position, once in a fourth slot position, twice in a fifth slot position and once in a sixth slot position.

Circuit 3 appears once in a first slot position, twice in a second slot position, once in a third slot position, once in a fourth slot position, twice in a fifth slot position and once in a sixth slot position.

As a matter of convenience, this relationship is set forth in Table II appearing below:

*TABLE II*

| Slot Position | 1 | 2 | 3 | 4 | 5 | 6 |
|---|---|---|---|---|---|---|
| Circuit "1" | X | XX | X | XX | | XX |
| Circuit "2" | XX | | XX | X | XX | X |
| Circuit "3" | X | XX | X | X | XX | X |

Before considering the performance of the armature winding 13, it is noted that the p.u. (per unit) voltage of only one of a number of parallel circuits in a phase comprises the ratio between the open circuit voltage generated in the one circuit and the rated voltage of the phase, and is a measurement of the magnitude of voltage unbalance between the one circuit and the phase. Similarly, the phase angle displacement between the open circuit voltage generated in the one circuit and the rated voltage of the phase is a measurement of the phase angle of unbalance between the one circuit and the phase. Furthermore, the relative heating in the armature winding is the highest I²R losses in one of the circuits thereof due to load current (and to circulating currents because of the unbalance in voltages and reactances among the multiple circuits) divided by the I²R losses due to equally divided load currents alone. Thus the performance of phase A of the armature winding 13 is set forth in Table III below:

*Table III*

| Circuit | "1" | "2" | "3" |
|---|---|---|---|
| Voltage Magnitude (p.u.) | 0.9987 | 0.9987 | 1.0026 |
| Voltage Phase Angle (radians) | −0.0010 | 0.0010 | 0.0000 |

This exceedingly high degree of balance among the three parallel connected circuits 1, 2 and 3 of phase A results in the negligible relative heating in the armature winding 13 of only 1.0177 (with the coil pitch of 15/18) due to the exceedingly small circulating currents among the three parallel connected circuits 1, 2 and 3 in phase A.

At this point, it is mentioned that in an acceptable multi-circuit winding of this character, the maximum allowable magnitude of voltage unbalance is 0.4%; the maximum allowable phase angle displacement is 0.0026 radian or 0.15°; and when the circuits of such a winding exhibit both magnitude of voltage unbalance and phase angle displacement, the limits for both of these items must be appropriately decreased in order to preserve acceptable relative heating of the winding. More particularly, the relative heating of any circuit should not be substantially in excess of about 1.040.

Accordingly, the pattern of the armature winding 13 is not only acceptable, but outstanding with respect to the exceedingly high degree of voltage balance among the three parallel connected circuits in each phase thereof and with respect to the exceedingly small phase angle displacement among the three parallel connected circuits in each phase thereof, and with the result that there is only negligible increased relative heating thereof, compared to an exactly balanced winding as previously noted.

Furthermore, the reactances of the circuits 1, 2 and 3 in phase A are essentially equal, whereby the phase current in the phase A is divided substantially equally in these three circuits; therefore the phase current supplied to the load by each of the phases A, B and C of the armature winding 13 is divided substantially equally among the circuits 1, 2 and 3 therein.

Of course, it will be understood that the relative heating in the armature winding 13 employing the present winding-pattern is dependent upon the coil pitch, as well as the other design factors, such as the rated flux per pole. For one particular design, the relative heating in the circuit having the greatest heating is calculated to have the values as set forth in Table IV below:

*Table IV*

| Coil pitch: | Relative heating |
|---|---|
| 12/18 | 1.0130 |
| 13/18 | 1.0408 |
| 14/18 | 1.0099 |
| 15/18 | 1.0210 |
| 16/18 | 1.0196 |
| 17/18 | 1.0430 |

In view of the foregoing explanation, it is apparent that the performance of the present armature winding 13, with the coil pitches 12/18, 14/18, 15/18 and 16/18 is outstanding, and with the coil pitch 13/18 is generally acceptable, and with the coil pitch 17/18 is ordinarily objectionable.

Again referring to FIG. 1, it will be understood that each coil in each circuit in each phase belt comprises the two coil sides 14 respectively disposed in the top of one of the slots 12 in the core 11 (indicated by the solid line through the area of the core 11) and in the bottom of another of the slots 12 in the core 11 (indicated by the dotted line through the area of the core 11), together with an end turn or connector 15. Also, each two coils in each circuit in each phase belt are interconnected by a regular connecting end strap 16, the connecting end strap 16 extending between the "out" end of one of the coil sides 14 of one of the coils and the "in" end of one of the coil sides 14 of the other of the coils. Further the eight series-connected coils in each of the three parallel circuits 1, 2 and 3 in the phase A are disposed in two or more of the phase belts A', A", A'", and A"", as previously explained; whereby the coils in different ones of the phase belts mentioned are cross-connected by special end straps 17, with the required poling of the coils mentioned by virtue of the arrangement thereof in different ones of the phase belts noted. In phase A, the three circuits 1, 2 and 3 are connected in parallel between the "in" terminal 21 and the "out" terminal 22. Again referring to the poling of the eight coils in each of the circuits 1, 2 and 3 in phase A, it will be observed in FIG. 1 that each of these three circuits proceeds from the "in" terminal 21 to the "out" terminal 22 in phase A in the clockwise direction in the positive phase belts A' and A'", and in the counterclockwise direction in the negative phase belts A" and A"", so that the induced voltage components in each of the eight coils in each of the three circuits are in cumulative series relation with one another for the purpose previously explained.

Reverting to the arrangement and distribution of the circuits 1, 2 and 3 in phase A of of the armature winding 13, it is re-emphasized that Table II sets forth the basic principle of this winding pattern, while Table I sets forth the specific example of this winding pattern, as illustrated in FIGS. 1, 2 and 3; whereby other specific examples of this winding pattern may be readily provided. By way of illustration, another specific example of this winding pattern is set forth in Table V appearing below:

*Table V*

| Slot Position | 1 | 2 | 3 | 4 | 5 | 6 |
|---|---|---|---|---|---|---|
| Pole N' | 3 | 1 | 1 | 1 | 2 | 1 |
| Pole S' | 2 | 1 | 2 | 1 | 3 | 1 |
| Pole N" | 2 | 3 | 2 | 2 | 3 | 2 |
| Pole S" | 1 | 3 | 3 | 3 | 2 | 3 |

Accordingly, it will be appreciated that in Tables I and V, there are set forth two specific examples of this winding pattern incorporating the basic principle thereof as set forth in Table II.

Furthermore, it is pointed out that the specific example of this winding pattern as set forth in Table I is ordinarily preferred with respect to that as set forth in Table V by virtue of the fact that the first-mentioned winding pattern is easier to wind into the armature core 11 than is the second mentioned winding pattern; however, both of these winding patterns are entirely comparable as a matter of performance in the generator 10.

In view of the foregoing, it will be understood that while it is thus more economical to provide each of the three phases A, B and C of the winding pattern as set forth in Table I, it is entirely feasible to utilize both of these specific winding patterns of Table I and V in different phases of the same armature winding 13 in the generator 10.

The winding arrangement or pattern of the present invention is very advantageous in view of the fact that it accommodates the three parallel connected circuits per phase in the armature winding 13, effecting a very substantial reduction in the voltages encountered in the generator 10, while maintaining a given k.v.a. rating thereof; whereby the arrangement permits a corresponding reduction in the thickness of the insulation of the casings enclosing the coil sides 14. For example, this improved 3-phase, 3-circuit, 4-pole generator running at 1800 r.p.m. may produce a line voltage of 20,000 volts (line-to-line) at a rating of 666,667 k.v.a. In contrast to the present improved generator, a comparable 2-circuit generator would produce a line voltage of 30,000 volts, while a comparable 4-circuit generator would produce a line voltage of 15,000 volts. Accordingly, the comparable 2-circuit generator mentioned operating at 30,000 volts would require substantially more insulation in the casings enclosing the coil sides of the winding, while the comparable 4-circuit generator mentioned operating at 15,000 volts would produce substantially greater current which would be costly to accommodate in the lines connecting the generator to the power system. This improved 3-phase 3-circuit generator effects a permissible reduction in the thickness of the insulation of the casings enclosing the coil sides 14 without an undue increase in the cooling facility; whereby additional space is available in the slots 12 in the core 11; which additional space may be used for various additional design purposes. For example, the width of the winding slots may be reduced so as to effect an increase in the cross-sectional area of the magnetic material of the core 11; on the other hand, the cross-sectional areas of the conductors of the coil sides 14 may be increased or the cross-sectional area of the cooling ducts disposed in the slots of the core 11 may be increased.

Accordingly, it will be appreciated that the present arrangement of the armature winding 13 reduces the voltages encountered in the generator 10, permitting an intermediate voltage between an undesirable high voltage corresponding to a 2-circuit armature winding and an undesirable low voltage corresponding to a 4-circuit armature winding, without reducing the k.v.a. rating thereof; whereby the permissible reduction in the required thicknesses of the insulation of the casings of the coil sides 14 provide the additional space in the winding slots 12 in the core 11 that is available for utilization in design factors effecting an increased rating of the generator 10, and without increasing the physical dimensions thereof.

In view of the foregoing, it is apparent that there has been provided in a polyphase generator, an improved armature winding arrangement that is effective substantially to increase the power output of the generator, without increasing the physical dimensions thereof, and that is simple and economical to manufacture.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A dynamoelectric machine comprising a polyphase, 3-circuit, 4-pole winding, each phase of said winding being arranged in four phase belts and including three parallel connected circuits, each circuit in each phase of said winding including a given number of series connected coils each having two coil sides, the coil sides of said winding being arranged in a predetermined pattern.

2. A dynamoelectric machine comprising a 3-phase, 3-circuit, 4-pole winding, each phase of said winding being arranged in four phase belts and including three parallel connected circuits, each circuit in each phase of said winding including a given number of series connected coils each having two coil sides, the coil sides of said winding being arranged in a predetermined pattern.

3. A dynamoelectric machine comprising a polyphase 4-pole winding, each phase of said winding being arranged in four phase belts and including three parallel connected circuits, each circuit in each phase of said winding including a given number of series connected coils each having two coil sides in each phase of said winding, a first phase belt including coils of the first and third circuits therein and a second phase belt including coils of the second and third circuits therein and a third phase belt including coils of the first and second circuits therein and a fourth phase belt including coils of only the third circuit therein.

4. A dynamoelectric machine comprising a polyphase 4-pole winding, each phase of said winding being arranged in four phase belts and including three parallel connected circuits, each circuit in each phase of said winding including a given number of series connected coils each having two coil sides in each phase of said winding, a first circuit having coils included in the first and the third phase belts and a second circuit having coils included in the second and the third phase belts and a third circuit having coils included in the first and the second and the fourth phase belts.

5. A dynamoelectric machine comprising a polyphase 4-pole winding, each phase of said winding being arranged in four phase belts and including three parallel connected circuits, each circuit in each phase of said winding including eight series connected coils each having two coil sides in each phase of said winding, a first phase belt including five coils of the first circuit and one coil of the third circuit and a second phase belt including five coils of the second circuit and one coil of the third circuit and a third phase belt including three coils of the first circuit and three coils of the second circuit and a fourth phase belt including six coils of the third circuit.

6. A dynamoelectric machine comprising a polyphase 4-pole winding and a multi-slot core therefor, each phase of said winding including three parallel connected circuits aranged in a plurality of series connected sections respectively disposed in a number of four phase belts, each circuit in each phase of said winding including eight series connected coils each having two coil sides and arranged in corresponding ones of the slots in said core, in each phase of said winding each phase belt including six of the coils thereof.

7. A dynamoelectric machine comprising a polyphase winding and a multi-slot core therefor, each phase of said winding including three parallel connected circuits arranged in a plurality of series connected sections respectively disposed in a number of four phase belts, each circuit in each phase of said winding including eight series connected coils each having two coil sides and arranged in corresponding ones of the slots in said core, in each phase of said winding each phase belt including six of the coils thereof, the coil sides of said winding being arranged in a predetermined pattern, wherein, in each phase of said winding, the adjacent coil sides in a first phase belt are disposed in the sequence: 111131, and the adjacent coil sides in a second phase belt are disposed in the sequence: 232222, and the adjacent coil sides in a third phase belt are disposed in the sequence: 212121, and the adjacent coil sides in a fourth phase belt are disposed in the sequence: 333333; where the numerals 1, 2 and 3 respectively indicate the coil sides of the respective ones of the three parallel connected circuits in the phase.

8. A dynamoelectric machine comprising a polyphase winding and a multi-slot core therefor, each phase of said winding including three parallel connected circuits arranged in a plurality of series connected sections respectively disposed in a number of four phase belts, each circuit in each phase of said winding including eight series connected coils each having two coil sides and arranged in corresponding ones of the slots in said core, in each phase of said winding each phase belt including six of the coils thereof, the coil sides of said winding being arranged in a predetermined pattern, wherein said core is provided with twenty-four slots per phase per set of four poles, and said winding is arranged in two layers in the slots of said core, and each of the six coils in each of said phase belts is chorded.

9. A dynamoelectric machine comprising a 3-phase, 4-pole winding and a 72-slot core therefor, said winding being arranged in four phase belts and in two layers in the slots of said core, whereby the pole pitch of said winding is eighteen slots of sail core, each phase of said winding including three parallel connected circuits arranged in a plurality of series connected sections respectively disposed in a number of the four phase belts, each circuit in each phase of said winding including eight series connected coils each having two coil sides and arranged in corresponding ones of the slots in each core, in each phase of said winding each phase belt including six of the coils thereof, and each of the six coils in each of said phase belts being chorded.

10. The dynamoelectric machine set forth in claim 9, wherein the coil pitch of each of said chorded coils is $12/_{18}$.

11. The dynamoelectric machine set forth in claim 9, wherein the coil pitch of each of said chorded coils is $13/_{18}$.

12. The dynamoelectric machine set for in claim 9, wherein the coil pitch of each of said chorded coils is $14/_{18}$.

13. The dynamoelectric machine set forth in claim 9, wherein the coil pitch of each of said chorded coils is $15/_{18}$.

14. The dynamoelectric machine set forth in claims 9, wherein the coil pitch of each of said chorded coils is $16/_{18}$.

15. A dynamoelectric machine comprising a polyphase winding, each phase of said winding being arranged in four phase belts and including three parallel connected circuits, each circuit in each phase of said winding including a given number of series connected coils each having two coil sides in each phase of said winding, a first phase belt including coils of the first and second and third circuits therein and a second phase belt including coils of the first and second and third circuits therein and a third phase belt including coils of the second and third circuits therein and a fourth phase belt including coils of the first and second and third circuits therein.

16. A dynamoelectric machine comprising a polyphase winding, each phase of said winding being arranged in four phase belts and including three parallel connected circuits, each circuit in each phase of said winding including a given number of series connected coils each having two coil sides in each phase of said winding, a first circuit having coils including in the first and the second and the fourth phase belts and a second circuit having coils included in the first and the second and the third and the fourth phase belts and a third circuit having coils included in the first and the second and the third and fourth phase belts.

17. A dynamoelectric machine comprising a polyphase winding, each phase of said winding being arranged in four phase belts and including three parallel connected circuits, each circuit in each phase of said winding including eight series connected coils, each having two coil sides in each phase of said winding, a first phase belt including four coils of the first circuit and one coil of the second circuit and one coil of the third circuit and a second phase belt including three coils of the first circuit and two coils of the second circuit and one coil of the third circuit and a third phase belt including four coils of the second circuit and two coils of the third circuit and a fourth phase belt including one coil of the first circuit and one coil of the second circuit and four coils of the third circuit.

18. A dynamoelectric machine comprising a polyphase winding and a multi-slot core therefor, each phase of said winding including three parallel connected circuits arranged in a plurality of series connected sections respectively disposed in a number of four phase belts, each circuit in each phase of said winding including eight series connected coils each having two coil sides and arranged in corresponding ones of the slots in said core, in each phase of said winding each phase belt including six of the coils thereof, the coil sides of said winding being arranged in a predetermined pattern, wherein, in each phase of said winding, the adjacent coil sides in a first phase belt are disposed in the sequence: 311121, and the adjacent coil sides in a second phase belt are disposed in the sequence: 212131, and the adjacent coil sides in a third phase belt are disposed in the sequence: 232232, and the adjacent coil sides in a fourth phase belt are disposed in the sequence: 133323; where the numerals "1," "2" and "3" respectively indicate the coil sides of the respective ones of the three parallel connected circuits in the phase.

References Cited by the Examiner

UNITED STATES PATENTS 2,015,562  9/35  Kilgore _____ 310—202
2,630,541  3/53  McElligott et al. _____ 310—198

FOREIGN PATENTS 1,153,761  10/57  France.

MILTON O. HIRSHFIELD, *Primary Examiner.*
ORIS L. RADER, *Examiner.*